April 7, 1942.　　　　G. K. GOULD　　　　2,278,697
AUTOMATIC TUBE TESTER
Filed Aug. 3, 1940　　　6 Sheets-Sheet 4

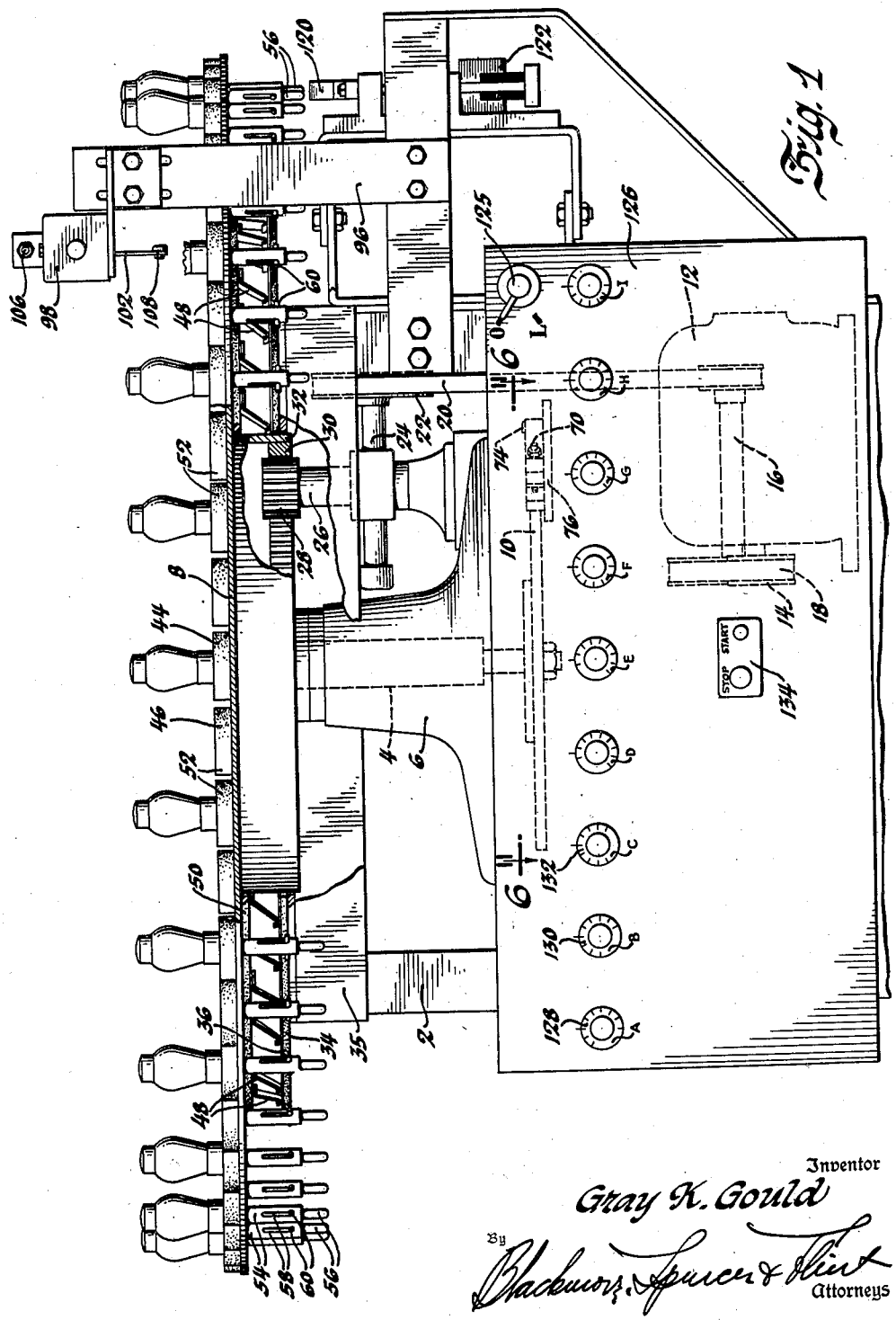

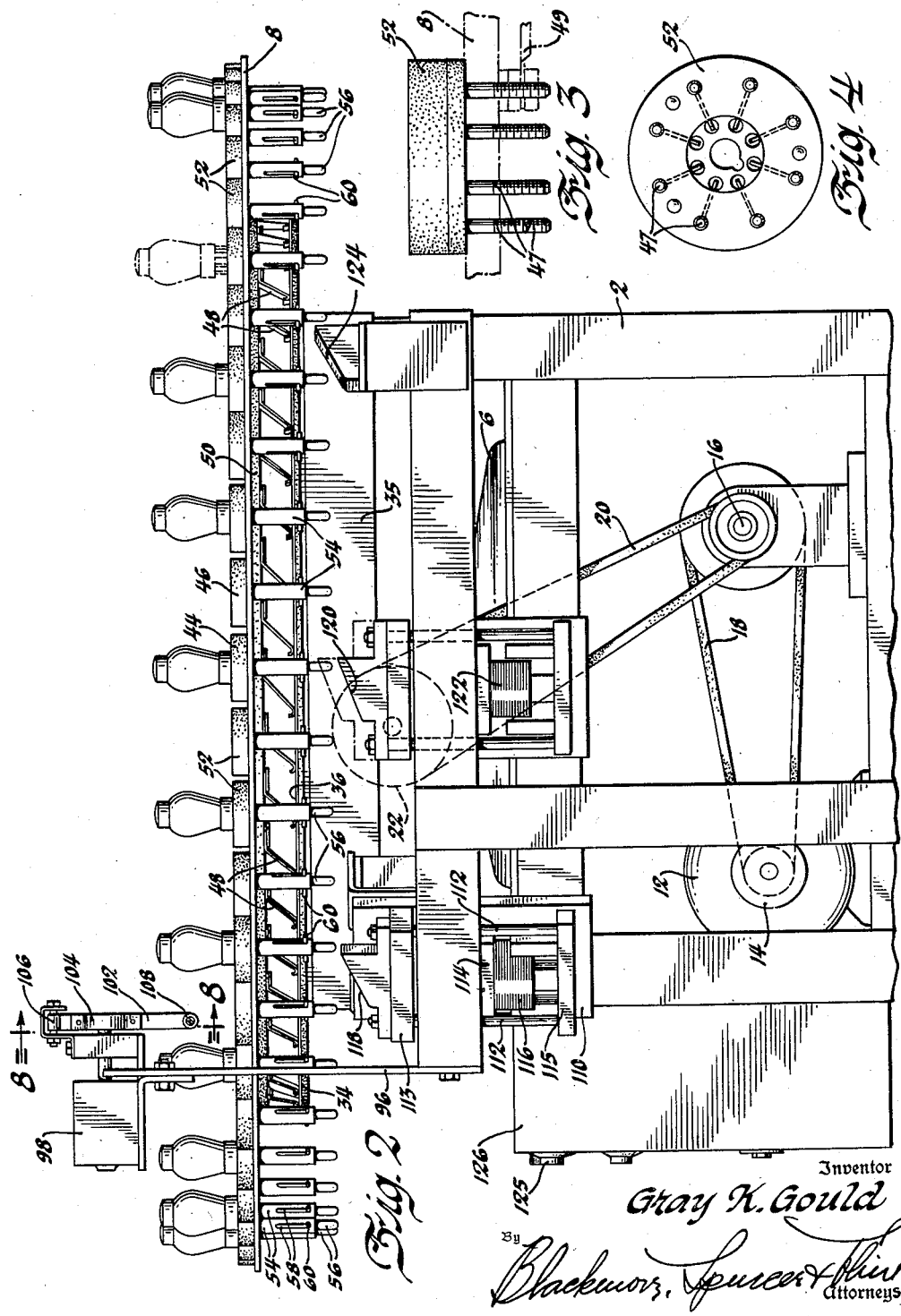

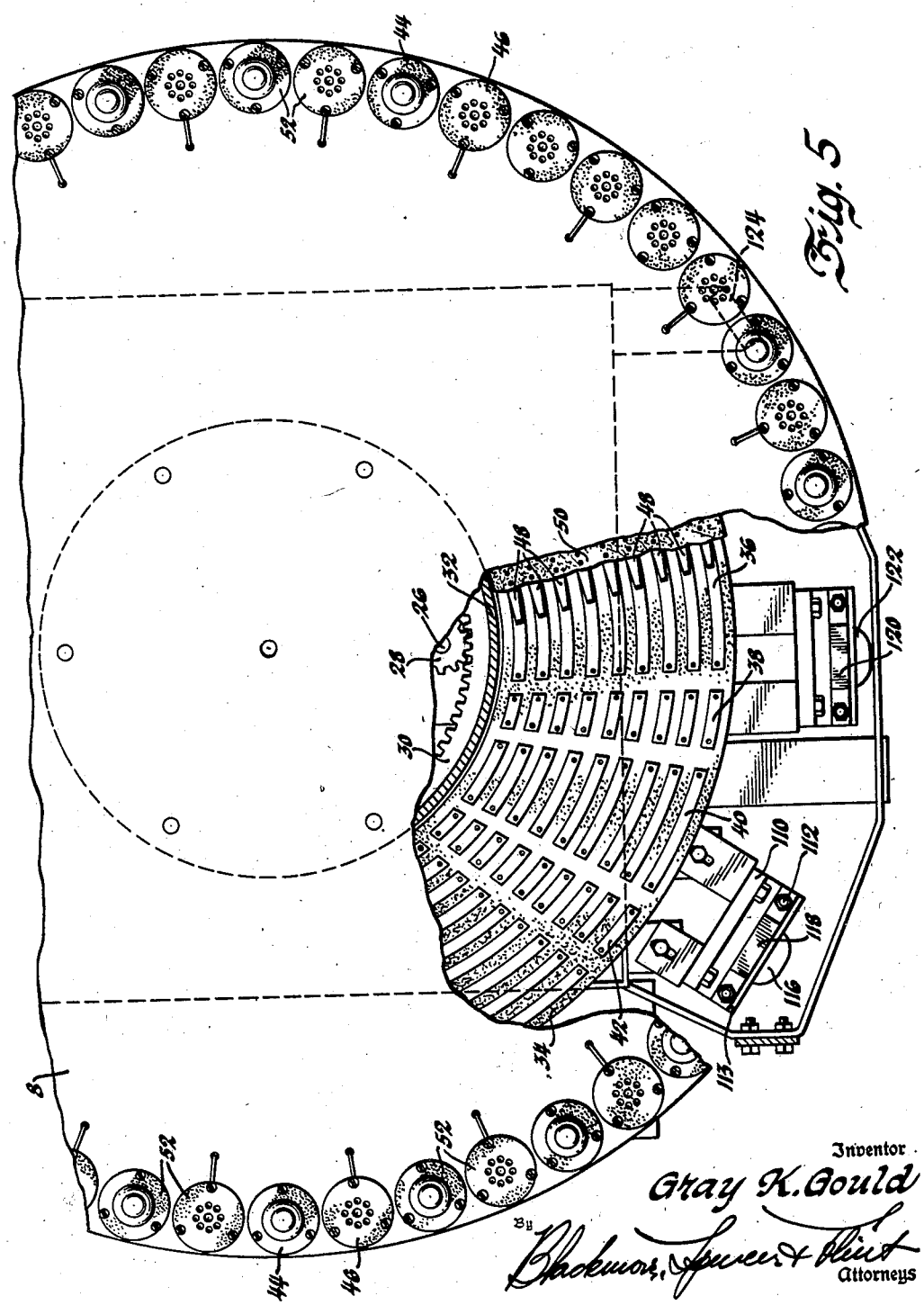

Inventor
Gray K. Gould
By Blackmore, Spencer & Flint
Attorneys

April 7, 1942.     G. K. GOULD     2,278,697
AUTOMATIC TUBE TESTER
Filed Aug. 3, 1940     6 Sheets-Sheet 5

Inventor
Gray K. Gould
By Blackmore, Spencer & Flint
Attorneys

Patented Apr. 7, 1942

2,278,697

UNITED STATES PATENT OFFICE 2,278,697

AUTOMATIC TUBE TESTER

Gray K. Gould, Kokomo, Ind., assignor to General Motors Corporation, Detroit, Mich., a corporation of Delaware Application August 3, 1940, Serial No. 350,529

14 Claims. (Cl. 250—27)

This invention relates to testing apparatus and more specifically to apparatus for testing electron discharge tubes commercially used in radio equipment. In the manufacture of radio equipment, for example, broadcast receivers, it is necessary to test or check the tubes designated therefor before they are installed in the sockets preceding the final testing of the entire receiver prior to shipping. In handling the tubes they often become broken internally, shorted, or the physical position of the electrodes therein changed to alter the operation sufficiently to make the same unusable since the characteristics would not be satisfactory. Therefore, it is necessary to test the same for short circuits, broken parts and emission before they are installed in the receivers and the final over-all inspection and test of the receiver made. There are, of course, a large variety of different types of tubes that are utilized in the present day production and these have varying numbers of electrodes therein and are used in different portions of the circuit. Furthermore, the corresponding electrodes are not connected in the same relative position to the conductive prongs that extend from the base of the different tubes, and, in addition, some tube bases differ radically from others, all of which complicates the testing procedure.

It is an object of my invention to provide a universal tube testing device which will test substantially all types of commercial tubes.

It is a further object of my invention to provide a tube testing device which will accommodate all types of tubes and apply all of the necessary tests thereto prior to their insertion in a receiver.

It is a still further object of my invention to provide a testing device which will apply all the tests without the necessity of handling the tubes except to insert the same initially and which will then follow through a sequence of tests automatically.

It is an additional object to provide such a testing device as mentioned above which will automatically eject the tubes at any point of test where they are found defective.

With the above and other objects in view, the embodiments of my invention will be best understood by reference to the following specification and claims and the illustrations in the accompanying drawings, in which:

Figure 1 is a front elevation of a machine embodying my invention, parts being broken away and shown in section;

Figure 2 is a side elevation of my device taken at right angles to the showing in Figure 1;

Figure 3 is an enlarged detailed view of one of the tube socket assemblies in elevation;

Figure 4 is a view similar to Figure 3 showing the plan view of the socket assembly;

Figure 5 is a top plan view of a portion of the device, parts being broken away;

Figure 6:
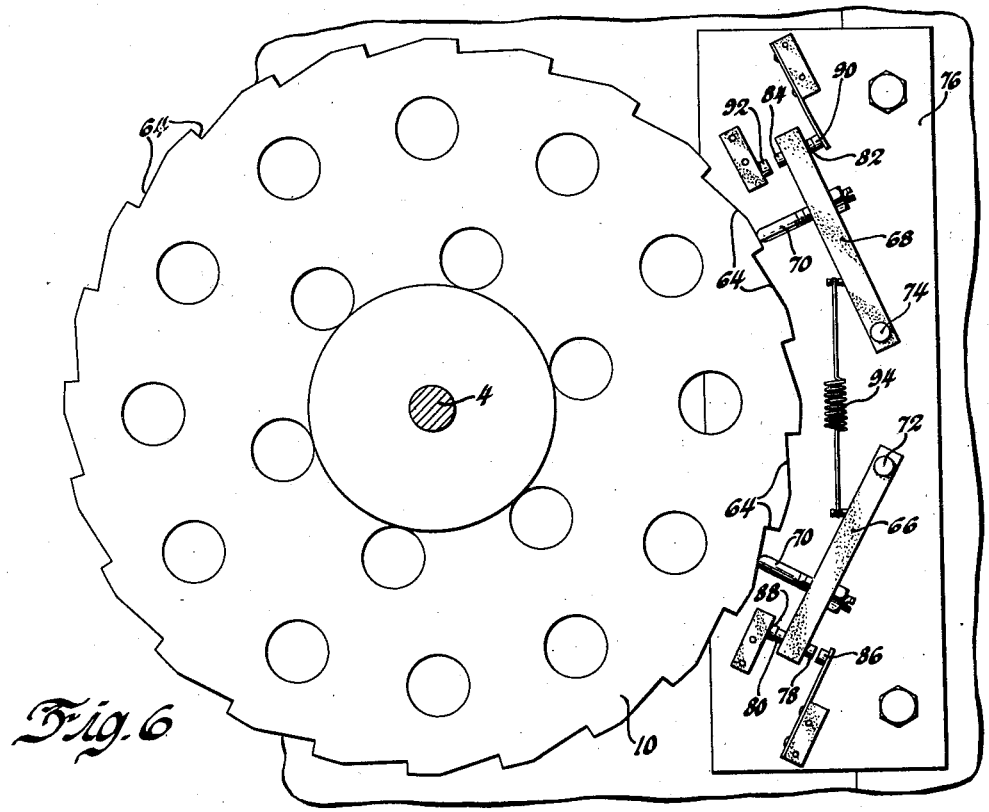
Figure 6 is a plan view of a ratcheting switch control actuated by turntable rotation.
Figure 7:
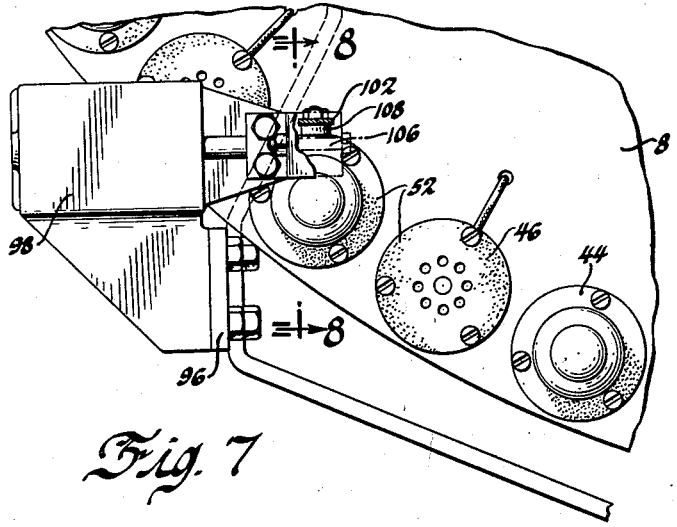
Figure 7 is a detail top view of the mechanical hammer for jarring the tubes.
Figure 8:
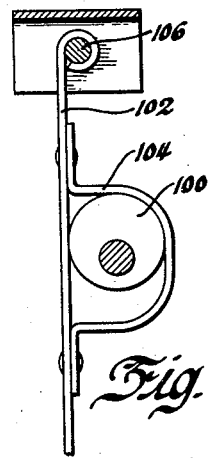
Figure 8 is an enlarged detail of the driving mechanism for the force-impelling hammer.

The particular embodiment of my invention herein is disclosed as a rotary table. The tubes to be tested are applied to the sockets thereon at a given peripheral station and as they rotate through approximately one revolution are given the necessary tests over different portions of their travel and are automatically removed therefrom at different positions depending upon their condition, and, if satisfactory, are removed just prior to the completion of one full revolution thereon. It is therefore only necessary to load the device and the tubes will then be automatically removed therefrom at the correct positions, dependent upon the tube condition, and will receive all the desired tests during this substantially one revolution of travel.

This particular device is, of course, only exemplary of one form which my broad invention may assume. It is desired to distinctly point out that the invention should not be so limited to this form as any form of continuous feed for articles may be used without departing from the broad scope of my invention.

Referring now more specifically to the drawings, there is shown in Figure 1 a box-like frame 2 which supports a vertically rotatable shaft 4 in a bearing member 6. To the upper end of said shaft is rigidly connected a comparatively large turntable 8 and to the lower end thereof a substantially circular ratchet wheel 10 for operating certain switches to be described. Mounted within the base is also a driving motor 12 having on one end of its shaft a pulley 14 which drives a countershaft 16 through belt 18. Also driven from the countershaft is a second belt 20 which drives a pulley 22 on a small stub shaft 24, said shaft being geared to a second shaft 26 at right angles thereto which has mounted on its upper end a pinion 28. This pinion is adapted to drive a large ring gear 30 mounted on the inner periphery of a circular band 32 carried by the lower surface of the turntable 8. Thus as the motor 12 operates, the turntable will be rotated through this train of force-transferring members.

Mounted concentrically with the band 32, outside the same and supported by the frame member 35 so that it is not rotatable, is a large annular ring 34 formed of Bakelite or some other insulating material which carries thereon a series of concentric conductive rings 36 which extend substantially around the disc and cover most of its area. These are of varying diameters, depending upon their distances from the center pivot. The portion between the two ends of each ring is occupied by bands having the same arcuate curvature, but broken into sector groups and forming substantially short arcuate members.

Referring specifically to Figure 5, it will be seen that there are three groups of these short arcuate conductor rings as at 38, 40 and 42. The purpose of all these conductive arcuate bands is to provide the correct switching contacts between the tube elements and the source of power supply and meters and they are broken into circumferential segments in order to apply different tests and voltages to the tube electrodes.

Mounted upon the top of the turntable 8 are a series of tube sockets 44 and 46, there being two styles or models of sockets, one for the so-called "Loctal" base tube and the other for the "Octal." The arcuate distances between the centers of two of the sockets is 7½° and the two are placed in alternate series around the periphery of the turntable. The various contacts such as 47 leading from the sockets are connected by wires 49 to spring contact members such as 48 mounted on the underside of the turntable but which are insulated electrically therefrom by an insulating disc 50, there being in each instance one spring contact clip for each contact of each socket, and, as shown, there are nine spring clips mounted on a radius for each tube which will, it is believed, be ample for any type of tube which might be inserted. It might also be mentioned at this point that the sockets of course are insulated from the turntable by an insulated pad such as 52.

Concentric with the center of each of the sockets there is mounted on the lower surface of the turntable a sleeve 54 within which rides a vertical rod 56 which may be moved axially with respect thereto. In diametrically opposite sides of the sleeve 54 there are provided long slots 58 in which a pin 60 extending diametrically through the rod 56 may move up and down. These rods 56 are provided for the purpose of ejecting a tube from the socket at certain desired times. The pin thus allows the rod to move axially in the sleeve and prevents its turning and also prevents it from dropping out. This rod is in the exact center of the socket and presses against the tube base when raised to pull the prongs from their openings.

From the description so far it will be evident that as the motor drives the turntable the various socket stations will be rotated and the spring clips 48 for each station will be caused to wipe over the series of circular bands 36, 38 and 40 to pick up and conduct to the tube elements the various voltages applied thereto and as the tube assumes different positions different voltages will be applied to the elements and different tests made upon the tube.

Mounted on the lower end of the rotatable shaft 4 is a substantially circular ratchet wheel or disc 10 which is best shown in Figure 6. This disc has in its periphery a series of notches 64 which actuate a pair of spaced pivoted arms 66 and 68 through pins 70 adjustably mounted in the two arms and so positioned as to be radially in the same plane as the disc 10. These arms are pivoted at spaced points 72 and 74 on a supporting plate 76 carried by the frame. Mounted on the outer or movable end of the arms 66 and 68 are two contact points 78, 80 and 82, 84, respectively. The arms vibrate between two substantially fixed contacts for each: namely, 86, 88 and 90, 92, respectively, which cooperate with the previously mentioned points 78, 80 and 82, 84. Since the two pivoted arms 66 and 68 are not directly in alignment, a tension spring 94 is connected to both and tensions them toward each other and toward the periphery of the disc 10. The notches 64 are so spaced that as the high point of one forces outwardly the pin of one arm, the low spot of the other will be approaching and allow the other arm to assume its innermost position. These notches are also so designed as to have their corresponding contours 15 arcuate degrees apart to control the two sets of sockets set 7½° apart, only one set being active at a time.

Outside the periphery of the turntable at one point there is an upwardly extending bracket 96 which supports at its upper end a small motor 98. The shaft of this motor is connected to an eccentric 100 which eccentric is mounted in an opening formed by a lever 102 and a U-shaped bracket 104 connected thereto, said assembly being pivoted to the support at its upper end 106 and carrying at its lower pivoted end a small resilient hammer 108. This motor is maintained energized at all times the device is in operation, and since the eccentric causes the lever to move back and forth it acts to hammer lightly the outer surface of the tubes as they ride past this point, and if any parts are weak will cause the same to collapse and the subsequent ejection of the tube.

The particular machine shown as an illustration of my invention herein is designed to test tubes for short circuits between various portions thereof, for mechanical strength of the elements, and for emission between the cathode and the remaining elements of the tube. It is necessary of course to test for these particular factors at different points in their travel and it is also desired to provide means for ejecting the tube at any point at which it is found defective and also to eject the tube into a container for satisfactory tubes at the end of its travel. In order to do this there is provided at the various stations tapered cams magnetically operated, said cams being best shown in Figure 2. In this instance there is a base 110 on which are slidably mounted two vertical rods 112 which are supported in brackets 113 and 114 secured to the base. To the lower extremities of the rods is secured a bar 115 which acts as an armature for a magnetic coil 116 and when the same is energized will raise the armature 115 which in turn causes the rods 112 to be moved upwardly which elevates the cam member 118 which is provided with a tapered cam surface. This cam is mounted adjacent the periphery of the turntable and has its sloping surface arranged so that the socket rods 56 will ride up thereon causing the tube to be ejected if the magnet elevates the same to a sufficient amount, otherwise the cam 118 would be out of contact with the lower tips of the rods 56 and no action would result.

The apparatus just described is that which is energized if the tube is shorted, there being provided a similar cam 120 operated by a magnet 122 if the tube does not have emission characteristics lying within a predetermined range. There is also provided at a point just prior to the point at which the tubes are fed into the turntable a fixed stationary cam 124 which causes all of the rods 56 to be moved upwardly and eject any tubes remaining in the sockets after all of the test points have been past, which are, of course, the satisfactory or good tubes.

It will thus be evident from the above description that through the wiper fingers 48 any element of any tube inserted in the socket may be connected to any other element or to any source of power by proper switching. Mounted in the front lower portion of the casing is a large box enclosure 126 which houses a plurality of switching means such as 128, 130 and 132 for connecting the various elements together or to a source of power supply. Of course, as long as only tubes of one particular design are being tested, it is only necessary to set up on this plurality of switches provided the combination initially and thereafter the machine will test this particular type of tube as long as desired. When, however, another type of tube is to be tested, it will be necessary to again reset the switches to the predetermined points before the test can progress with the new type of tube. It might be mentioned at this point that the first five switches: namely, A, B, C, D and E, are used to control the circuits to the plates or grids of the tubes to be tested. F and G control the cathode circuits and H and I the heater circuits. These particular switch knobs also control a plurality of different layers of switches; that is, there may be a rotating switch point which can be set by the knob A and spaced axially on that shaft a second rotating switch point with its cooperating contacts for additionally setting necessary switches and in this instance A, B, C, D, E, F and G are two-layer switch assemblies and H and I three-layer. Switch handle 125 is connected to and operates the double-pole, double-throw switches 154 and 156 for changing from Octal to Loctal base tubes as indicated by O and L on the switch case. There is also provided a small start and stop switch 134 which it is necessary to actuate before the machine can be operated.

Figure 9:
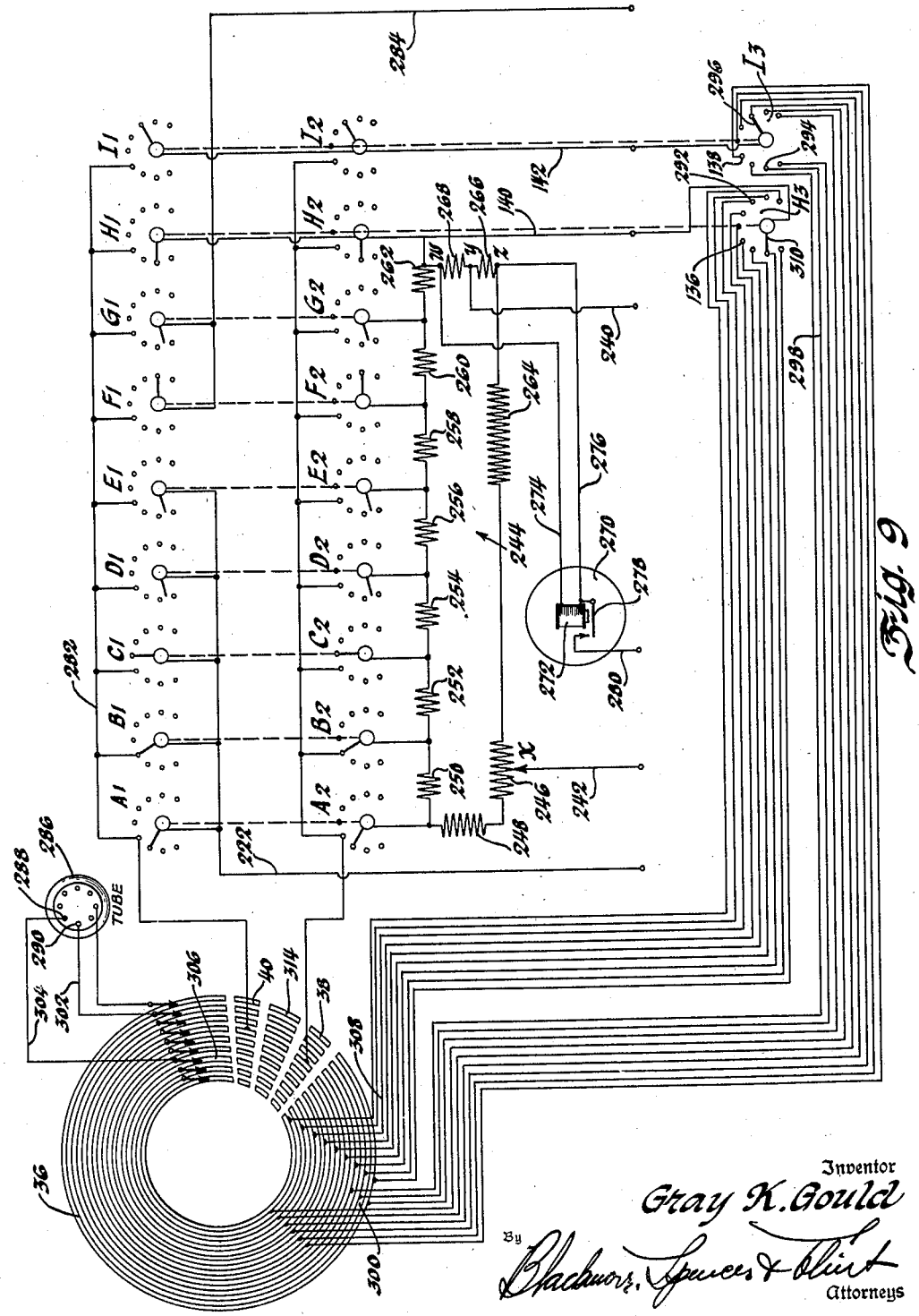
Figures 9 and 10 each show part of the total schematic wiring diagram of the testing device and in combination show the whole control circuit.
Figure 10:
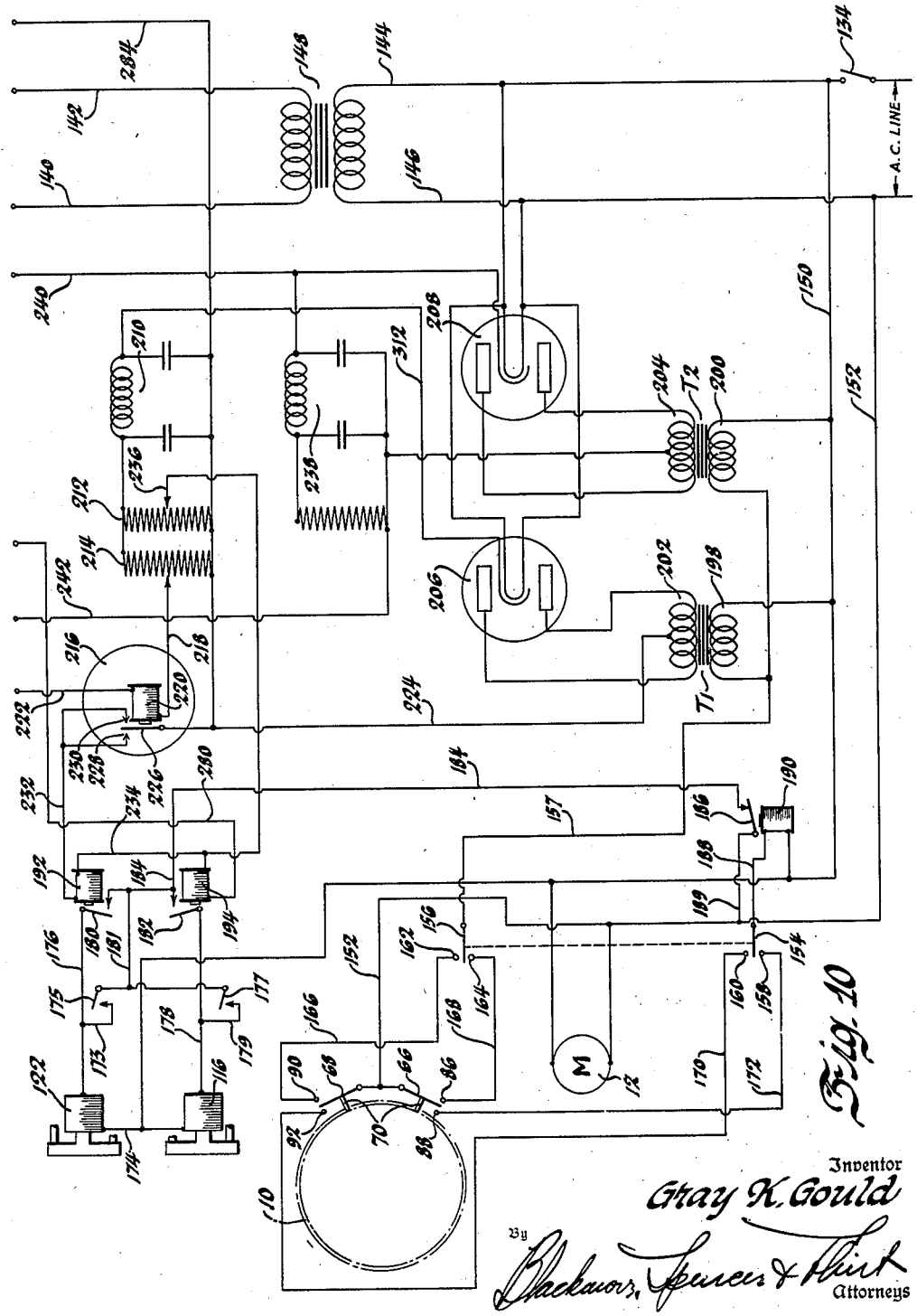

Referring now more specifically to Figures 9 and 10 which in combination illustrate the complete wiring diagram of the system, there is shown diagrammatically the arcuate conductive strips 36, 38 and 40 in the upper left-hand corner of Figure 9. These strips, it will be recalled, are mounted below the turntable and have riding thereover a series of nine spring wiper fingers for each tube socket. Taking first the longer arcuate strips 36, any one of these may be connected through suitable contact fingers to the stationary switch points 136 and 138 of the rotary switches H₃ and I₃, respectively. The center movable switch arms of these two switches are connected directly to the incoming supply line 140, 142 which has six volts thereon. Through this portion of the apparatus the heater elements of the tube may be connected to the supply, regardless of which prongs of the tube they are connected between or what type of tube happens to be placed in the socket. It is necessary to heat up the tube before the proper tests can be made and this is done while the turntable is rotating through this major portion of its entire travel, the tubes being inserted in their sockets adjacent one end of the strips 36 which gives substantially the whole arcuate distances for the tubes to heat up. The movable switch arms of the switches H₃ and I₃ are set on the contact necessary, depending upon the particular type of tube.

The current is supplied by the A. C. line identified in the lower right-hand portion of Figure 10 and the switch 134 controls the entire power to the device. The incoming line supplies lines 144 and 146 with voltage at approximately 110 volts and connected directly across the same there is a transformer 148 for obtaining therefrom the desired six volts which is applied to lines 140 and 142. Directly across the incoming A. C. line there are two lines 150 and 152 which extend directly up to and have connected across them the driving motor 12 whereby as long as the switch 134 is closed the motor will be operated to turn the turntable. Line 152 is also connected to movable switch arms 66 and 68. The single-pole, double-throw switches 154 and 156 are connected to operate in unison by arm 125 as shown by the dotted line connecting the same and are thrown from one set of contacts to another, depending upon the type of tube being tested, switch 154 contacting either stationary contact 160 or 158 and switch 156 contacting either 162 or 164. Switch contact 162 is connected by line 166 to stationary contact 90 of pivoted switch 68 which is operated by the ratchet wheel 10, and switch contact 164 is connected by line 168 to stationary contact 86 of the cooperating pivoted switch 66. In like manner stationary contact 160 of switch 154 is connected by line 170 to stationary contact 92 of switch 68, and contact 158 is connected by line 172 to stationary contact 88 of switch 66.

Line 150 which is connected to the main supply extends to a common line 174 which is connected to both relay coil 122 and also one terminal of relay coil 116 which coils operate to raise the tapered cams for the expulsion of the tubes at the different positions depending upon their condition. These relays are what might be termed power relays and consume a comparatively large amount of current. Connected to the opposite terminal of the relay coils 122 and 116 are lines 176 and 178, respectively. In each of these are located switches 180 and 182 to control the power to these two relays, the opposite sides or both of these switches being connected to a common line 184 which terminates in switch 186 connected to the power line 152 through line 189. Relay coil 190 is connected to line 150 and line 188 and operates the switch contact 186 which is spring closed and opens upon relay energization. Line 188 is connected directly to movable switch arm 154. Switch 180 controlling the energization of power relay 122 is operated by relay 192, and switch 182 controlling power relay 116 is operated by relay coil 194. These last mentioned two relays are controlled directly by apparatus depending upon the condition of the tubes. Connected to line 176 is a short line 173 in which is connected a switch 175 and in like manner a switch 177 is connected to line 178 by line 179. These two switches are connected together and their common line 181 tapped to line 184. These are provided to close a holding circuit for either power relay 116 or 122 and are mechanically closed by the cam movement caused by the energization of the relay which they control and stay closed until relay 190 is energized to open switch 186. This prevents chattering and non-positive action of the power relay once it has been energized.

Pivoted switch contact 156 is connected directly through line 157 to one side of the primaries 198 and 200 of two transformers $T_1$ and $T_2$ whose secondaries 202 and 204 supply power for two rectifier tubes 206 and 208. Tube 206 supplies the power through a filter system 210 and through a variable pair of parallel resistances 212 and 214 which supplies current to a galvanometer relay 216 which is very sensitive to slight changes in voltage. The output of said filter and variable resistances is applied to line 218 which is connected to the coil 220 of the galvanometer relay, the opposite side of which is connected by line 222 to the movable terminal of the first layer of switches $A_1$–$E_1$ inclusive. The center tap of the secondary 202 of the transformer $T_1$ is connected through line 224 to the switch contact 226 of the galvanometer relay 216 which may contact either stationary contact 228 or 230, the same being connected together and through line 232 to one side of the relay 192, the opposite side of said relay being connected by line 234 to one side of relay 194 and also to the adjustable tap 236 on resistor 212.

The output from rectifier 208 passes through filter 238 and is applied across lines 240 and 242 to a bridge indicated generally at 244. This bridge includes in one leg a variable resistance 246, a fixed resistance 248, and a series of independent resistances 250, 252, 254, 256, 258, 260 and 262. In the second leg there is also a portion of the variable resistance 246 and a fixed resistor 264, in the third leg a resistor 266, and in the fourth a resistor 268. Across the bridge there is placed a galvanometer relay 270, the coil 272 of which is directly connected across the bridge by lines 274 and 276. The coil 272 operates a switch member 278 connected to line 276, the opposite switch contact being connected to line 280 which is connected to one side of the relay 194. Connected between each of the resistors 248—262, inclusive, are the movable or rotatable switch elements of the switches $A_2$, $B_2$, $C_2$, $D_2$, $E_2$, $F_2$ and $G_2$, respectively.

The fixed contact points of the first tier of switches are connected to the various arcuate members of the group 40 by a series of lines, one of which is shown, the spring socket fingers wiping the arcuate contacts on the insulating disc to complete the connection to the tube. Only one point is shown so connected and the remainder are omitted so as not to be too confusing and in this first tier it might be mentioned that $A_1$–$E_1$, inclusive are to control the connection of the plate and grid electrodes, $F_1$ and $G_1$ to control the cathode electrodes, and $H_1$ and $I_1$ to control the heater electrodes. It is also desired to point out that the movable or rotating switch arms of $F_1$ and $G_1$ are connected together through line 284 which in turn is connected to one side of the filter 210 and to the line 224. The movable switch points of the heater switch H are connected in all three tiers; namely, $H_1$, $H_2$ and $H_3$ to one side of the transformer through line 140 and the corresponding rotating switch elements of the three tier I switches are connected to the opposite side of the transformer secondary through line 142. Thus one of the H and I switches controls the heater elements at all times. The fixed contacts of the second tier of the switches $A_2$–$I_2$ inclusive are connected to the various arcuate members of the group 38 and again only one line is shown to prevent confusion, the others being connected to the other fixed terminals in exactly the same way. It will be thus evident that any socket terminal may be connected to any of the rotating or movable switch points by this arrangement.

The operation of the device will now be described:

As before mentioned, a tube is applied to the corresponding socket which travels on the periphery of the turntable 6 and in approximately one revolution it receives the necessary tests and is automatically ejected. When it is applied to its socket, this socket is located above one end of the long arcuate rings 36, and to these rings are connected the various stationary contacts 136 and 138 of the switches $H_3$ and $I_3$, respectively. Since the two heater elements are not always connected to the same relatively positioned prongs in the tube base, it is necessary to set the movable switch arms $H_3$ and $I_3$ to the proper contact to cause the six volt supply to be connected across the proper two prongs to apply this voltage to the heater element of said tube.

Let us assume therefore that the tube we are testing is indicated as in Figure 9 at 286 and the prongs 288 and 290 are those connected to the heater element. These prongs are connected through the socket contacts such as 47 and their connecting lines 49 to the spring wiper fingers 48, and, as shown in this instance, would contact with the third and eighth rings counting outwardly from the center. It is therefore necessary for the setting on $H_3$ and $I_3$ to connect the third and eighth rings with the source and therefore the switch arm for $H_3$ will be set on contact 292 and $I_3$ on contact 294.

Tracing out the circuit for the heater, we now obtain the following: Entering the A. C. incoming line through switch 134, line 144 through the primary of the transformer 148 and back through line 146 to the source. This energizes the transformer and from the secondary thereof we proceed through line 142 to the rotating switch member 296, contact 294, line 298, ring 300, line 302 to the filament heater, out of the opposite side of the heater element to line 304, ring 306, line 308, contact 292, rotating switch arm 310 of the switch $H_3$ to the line 140 back to the secondary of the transformer. This will cause six volts to be applied to the heating element during the time that the turntable rotates through the arcuate distance equal to the length of the rings 36. This is necessary to allow the tube to heat up to operating temperature and during this period no test is made upon the tube. At a point adjacent the ends of the rings 36 the tube is vibrated by the electric hammer 108 to make sure that there are no mechanical weaknesses in the tube.

When it reaches the ends of the rings 36 the spring contact members associated with the tube that is being tested now comes to the series of contacts 38 which are those which allow us to apply the necessary measuring and supply circuits for testing the tube for any possible short circuits therein and in this instance it is necessary to set the various switches $A_2$–$G_2$ inclusive to the proper positions depending upon the location of the base prongs for the different tube elements. This testing is carried out by means of the bridge circuit identified generally by 244 and it is desired to place between each of the tube elements a certain amount of resistance; for example, between the grid and the plate and between the plate and another grid, etc. In order to do this the movable switch arm of the switch $A_2$ is set upon a contact corresponding to the ring which is connected through the spring finger to that particular element of the tube; for example, if the tube had two grids and two plates, $A_2$ would be set to connect to the first grid, $B_2$ to connect to the second grid, $C_2$ to the first plate and $D_2$ to the second plate. If there were no other elements $E_2$ would remain in any position. At this particular portion of the procedure $H_2$ and $I_2$, since they are on the same shaft as $H_3$ and $I_3$, are set on the same positions as the latter and therefore still connect the heater element across the six volt supply. $F_2$ and $G_2$ in this instance control the connection of the cathode of the tube.

Assuming now that the apparatus has just entered this phase of the test, the heater is energized through a similar circuit to that just described; the motor is of course turning the turntable inasmuch as it is always energized when switch 134 is closed through an obvious circuit. As before mentioned, the sockets to which the tubes are applied are 7½° apart and are alternate in design; that is, there is a Loctal socket and next an Octal socket. It is, of course, desired to only have one socket connected to the arcuate segments upon short circuit test at one time and therefore these small arcuate contacts only cover approximately 7½° so that there never can be more than one series of contacts connected to a socket contacting the same at one time. It is however necessary to provide means for switching from the Loctal group to the Octal group and in order to do this the switch 125 on the front of the panel is set to whichever type of tube is being tested. In this instance it is assumed that the Octal base tubes are being tested and therefore the switches 154 and 156 operated by manual control 125 will be in their upper position; that is, in contact with points 160 and 162, respectively. These switches are connected to the pivoted switches 66 and 68 operated by the ratchet wheel 10 on the main shaft and their purpose is to turn on and off the power at the beginning and end of this portion of the test. The following circuit is therefore provided to energize the transformers $T_1$ and $T_2$ at this time: Beginning with line 152, switch 68, switch point 90, line 166, contact 162, switch arm 156, line 157, transformer $T_1$ primary 198, and $T_2$ primary 200 to line 150 and return. This energizes the bridge circuits for testing and these are maintained with a sufficient power supply during the time that the switch 68, 90 is maintained closed.

Let us assume therefore that the particular test being run was on a tube which is shorted and therefore through steps to be more definitely described relay 194 is energized. This closes switch 182 and energizes power relay 116 through the following circuit: Line 150, line 174, relay coil 116, line 178, switch arm 182, line 184, switch 186, line 189, through line 152 to the other side of the circuit. This causes energization of power relay 116 which raises its armature to hold the slanting cam 120 in its upper position to cause the ejection of the defective tube. At the same time when the armature is raised switch 177 is mechanically closed through this movement to close a holding circuit around switch 182 so that the power relay will not chatter but will maintain its armature in raised position for approximately 7½° of rotation as provided by the teeth on the wheel 10, the other 7½° of one cycle being off time.

As before mentioned, the switch 186 is normally spring or gravity closed and since this is the only other switch in the line after the holding switch 177 closes, this must be opened in order to cause deenergization of the relay 116 and the return of its cam to normal inoperative position. Thus as we reach the position in which the pin 70 on the switch arm 68 recedes into a low place in the periphery of the toothed cam and the contact between the arm 68 and the switch point 90 will break and contact will be made between 68 and 92. This causes a circuit through coil 190 as follows: Line 150, coil 190, switch 154, switch point 160, line 170, contact 92, switch 68 and line 152. This energization causes the switch 186 to be opened, breaking the circuit to the coil 116 and causing the cam to descend so that it will be in its proper inoperative position for the next tube coming by.

It will thus be evident that the normal cycle is first the energization of the transformers $T_1$ and $T_2$ to provide power for the various tests through the bridge circuits, second, to energize the power relays 116 and 122 if necessary, that is, if the tubes are found to be defective in certain characteristics and, lastly, the energization of relay 190 to cause a breaking of the holding circuit to return either power relay 116 or 122 to its normal inoperative condition.

If the tubes to be tested are Loctal instead of Octal as before suggested, the control knob 125 on the front of the panel is turned to its lower position or opposite L, the switches 156 and 154 then engage the two lowermost contacts 158 and 164 and instead of using switch 68 switch 66 will now control the same sequence of events. Again tracing our circuits for the various energizations and assuming that 154 and 156 are down and that switch 66 is riding on the upper portion of the cam having the largest radius which would cause 66 to engage contact 86, the circuit is as follows: Line 152, switch 66, contact 86, contact 164, switch 156, line 157 to transformer primaries for $T_1$ and $T_2$, line 150 and return. This causes the same energization of the two transformers as before. The actuation of the power relays 116 and 122 is exactly the same and in this case when the cycle has been completed and switch 66 recedes to swing against its rear contact 88, this will cause energization of the coil 190 to open switch 186 to break the holding circuit as follows: Line 152, switch 66, contact 88, line 172, contact 158, switch 154, line 188, relay coil 190 and line 150 and return. This energizes the coil 190 to open switch 186, breaking the holding circuit and return the same to its normal inoperative condition It will be evident from the above description that for certain test purposes and during certain periods the transformers $T_1$ and $T_2$ are energized to provide power for the required tests. In the present instance there are two main tests applied to the tubes. The first is one to ascertain whether there are any short circuits between any elements within the tube and the second to test to see if the electron emission between the tube elements is within certain predetermined limits. Taking first the short circuit test, as the turntable rotates, as before mentioned, when the tube is applied to the socket for test its electrodes are first connected through circuits already described to the arcuate rings 36 which extend over a substantial portion of the arcuate distance of the whole circular area. During this time only the filaments of the tube are connected through provided circuits to sources of power and the tube is allowed to heat up to its normal operative temperature.

The nine spring contact clips then pass from the area of these arcuate rings 36 over a short gap and next contact the arcuate members 38 and it is during the time that they are in contact with the series of these arcuate members that the short circuit test is applied thereto. The series of switches $A_2$–$I_2$ inclusive are those set during this period to control the short circuit test and their setting is dependent of course upon the particular type of tube being tested. The number of switches in this instance which it is necessary to set of course depends upon the number of electrodes which the particular tube happens to have. In other words, if there are five electrodes or the tube is a pentode then it will be necessary to set five of the switches upon the proper switch contacts in order to connect each of the electrodes into the testing bridge circuit. This bridge circuit contains the resistors 246–268 inclusive, and has connected across the output of said bridge a galvanometer relay 270 which operates to control the relay 194.

The power provided for this bridge circuit is obtained from transformer $T_2$ and rectifier 208 in the secondary circuit thereof. There is also provided in this output circuit a filter circuit 238 to smooth out the power obtained therefrom. The output from this power circuit providing the input to the bridge is obtained across lines 240 and 242 which is across the points X and Y of the bridge. It will be noted that point X is variable to alter the amounts of resistance in two adjacent bridge legs to initially set the galvanometer relay 272 so that the same will be balanced. The output of the bridge is across points W and Z and across these two points there are connected the two lines 274 and 276 leading to the galvanometer relay 272.

The four arms of the bridge are therefore XW which includes a portion of resistor 246 and resistors 248–262 inclusive, WY which includes resistor 268, YZ including resistor 266, and ZX which includes resistor 264 and a portion of resistor 246, depending upon the location of the contact X. It will also be noted that between each of the switch points $A_2$ and $B_2$, $B_2$ and $C_2$ etc. there is located a certain amount of resistance. During the time that the tube socket is opposite this set of contactors 38, the plate switches $H_2$ and $I_2$ control the flow of power to the heating element exactly the same as the switches $H_3$ and $I_3$ control the same during the time that the tube was over arcuate rings 36. The setting of course of these two switches would be identical to $H_3$ and $I_3$ and therefore the power is continued to be fed to the heating element after the short gap between 36 and 38 has been passed over.

Assuming therefore that switch $A_2$ is set on one of the stationary contacts equivalent to the location of one of the grids of the tube, $B_2$ is set opposite the location of a second grid, and $C_2$ is set upon one of the plates and $D_2$ a second plate, these being the only elements of the tube, if the circuits between each of these elements is open, which is of course normal, the bridge will remain exactly as just previously described. If, however, let us assume that one grid is touching another grid, the resistance 250 will be shorted out or an equivalent parallel circuit of considerably less resistance introduced thus altering the condition of the bridge between points X and W. This causes an unbalancing and current to flow in the electronic relay circuit and energizes relay 272. It will be evident that if each of these switches $A_2$–$D_2$ inclusive are as many as are needed to connect each element of the tube to the control members, all of the elements will be connected across resistors in the bridge arm. Thus if any element is shorted against any other element it will change the flow of current through the resistors and energize relay 272. Resistor 248 is provided in this leg of the bridge so that if by any chance all of the elements are shorted within a tube there will still remain some resistance in this portion of the branch to protect the apparatus.

If the relay 272 is energized which of course would follow an unbalancing of the bridge, it then closes its switch arm 278 to provide a current flow through line 280 to cause an energization of the relay 194 which will close in turn its switch 182 to cause the power relay 116 to be energized and the ejector cam controlled by the same to be raised and the tube thrown out. The energization circuit for the relay coil 194 is as follows: The output electrode of rectifier tube 208, through line 240 to point X, resistor 266, line 276, switch 278, line 280, relay coil 194, line 234, resistor 212, line 224 to the midpoint of the secondary 232.

As the turntable continues to rotate the series of spring contactors will next pass over a series of arcuate members 314 which are connected in the circuit in the same manner as the long arcuate rings 36 and are merely provided to give a short space between tests and still maintain the tube in its heated condition. They next pass to the series of arcuate members 40 and during the time that they engage these the emission test is applied thereto and if the tube has satisfactorily passed the short circuit test which follows immediately after the tube has been vibrated by the electric hammer 108, they will be tested for emission.

It is, of course, well-known that the tubes in a radio receiver operate by virtue of the stream of electrons which pass between the cathode and anode and that it is due to the variations in this stream of electrons caused by varying potentials on other control electrodes that the necessary amplification or detection is acquired. In the present instance the test is made for electron flow between the cathode and the remainder of the electrodes of the tube which through the provided switching are connected together to act as one element; that is, the switches are so set that each grid is connected to each plate and all act as one electrode. The cathode is then connected to the opposite side and the emission between the two must fall within prescribed limits or the tube is not considered satisfactory. Here again as in the prior instances switches $H_1$ and $I_1$ control the circuits to the heater element of the tube and as before are of course set in the same radial position as switches $H_2$, $I_2$ and $H_3$, $I_3$ and the heater is therefore provided with current from the six volt source or secondary of the transformer 148.

The rotating switch members of the switches A1-E1 inclusive are all connected together and to the line 222 and each of the stationary switch points of each of these switches are connected to one of the arcuate members of the group 40. Thus by setting each switch A1, etc. to the correct peripheral contact for the element occurring in that location, we are able to connect all of these grid and plate circuits together. The two cathode elements are connected together and to line 284. The electronic relay 216 is that which controls the emission circuits and it controls a movable switch arm 226 which oscillates between two switch points 228 and 230. If the pull of the electromagnet 220 is too strong the switch closes on point 230, or if too weak on point 228, but if it is satisfactory and balanced within the range, this switch is not closed and the attendant relay 192 is not energized.

The strength of the current supplied to relay coil 220 is varied by the resistor 214 which is shown as variable and which is balanced at the initiation of the test. The circuit for this relay 220 is as follows: From the output electrode of the rectifier tube 206, to line 312, filter 210, resistor 214, line 218, relay coil 220, line 222, to the grid and plate elements of the test tube connected together as one electrode through switches A1, B1, etc., line 282, through the electron stream of the tube to the cathode elements, through the switches F1 and G1, line 284, line 224, back to the neutral point of the transformer secondary 202. With the current flowing through the electron stream, let us assume that there is too large a flow. Therefore more current than necessary will flow through the circuit just traced and the relay coil 220 will attract the switch 226 to close on point 230. This completes an energizing circuit for the relay coil 192 as follows: From the cathode of the rectifier tube 206 through line 312, filter 210, resistor 212, line 236, line 234, relay coil 192, switch 230—226, line 224, to the neutral point of the transformer secondary 202. If this switch 226—230 closes, relay coil 192 will close switch 189, energizing power relay 122 which will raise the sloping cam and cause ejection of the tube as falling outside of the desired emission range. As the mechanical cam and armature are raised, the holding switch 175 will be mechanically closed as it is secured to the side of the movable member. This closes a shunt circuit around the switch 180 and thereafter the power relay 122 is maintained energized to prevent chattering and hold it in its upper position a sufficient length of time so that the tube may be ejected. A similar switch 177 of course is applied to provide a holding circuit for power relay 116 for the short circuit test in exactly the same manner.

Thus we have energized power relay 122 and elevated its attendant cam to eject the tube if its emission characteristics fall outside of the prescribed range. When the turntable has rotated a sufficient amount to allow the spring contact fingers to pass beyond the sector of segments 40 the notched cam 10 will allow switch 66 or 68, depending upon which way the switches 154 and 156 are thrown, to energize relay coil 190 through circuits previously described to cause switch 186 to open, thus deenergizing the circuit to power relay 122 and a descent of the cam to its inoperative position ready for the test of the next tube.

If the tube passes beyond the short circuit and the emission test it then proceeds to a position adjacent the stationary tapered cam 124 at which point the reciprocable rod 56 will ride up the tapered surface thereof and eject the tube at this point into a bin for good tubes. This, of course, clears all the sockets and further tubes may be applied adjacent this position for testing as this will be adjacent the initial portion of the long arcuate rings 36.

Summarizing, a tube is applied to the point just mentioned and through the spring contact fingers there is provided power to the heating element. It progresses to a point near the ends of the arcuate rings 36 at which time the electric hammer 108 vibrates the same to make sure that the tube does not have any weak parts. It then progresses to the second set of segments 38 where the short circuit test is applied and if the tube is found to have shorted elements the relay 116 is energized to raise its cam 118 and cause the ejection of the tube at this point. If the tube is not shorted it proceeds over the set of contacts 314 which merely maintain the tube heated to the set of segments 40 where the emission test is applied. Here if the emission is not correct the relay 122 is energized to cause the ejection of the tube at this point. If the tube is entirely satisfactory from the viewpoint of this machine and series of tests the tube then progresses to the point at which the stationary tapered cam 124 forces the tube from the socket into the good bin and clears the turntable for the application of further tubes. It will thus be evident that the only manual effort required is in the initial loading of the turntable and that the tubes are ejected therefrom at different stations, depending upon their character and the table is finally cleared of the good tubes just prior to the station at which it is loaded. In this manner tubes can be tested very rapidly and are ready for application to radio receivers.

I claim:

1. In a testing machine for multiple electrode tubes, a plurality of aligned sockets having a plurality of electrode contacts and movable along a predetermined path for supporting tubes to be tested, measuring means, voltage supply means, switching means for connecting the contacts to both the measuring and the voltage supply means in any combination and variably at different portions of their travel whereby a series of tests may be made at successive points.

2. In a testing machine for multiple electrode tubes, a plurality of aligned sockets having a plurality of electrode contacts and movable along a predetermined path for supporting tubes to be tested, measuring means, voltage supply means, switching means for connecting the contacts to both the measuring and the voltage supply means in any combination and variably at different portions of their travel whereby a series of tests may be made at successive points, and automatic means for ejecting a tube from its socket if it does not meet the requirements of any test.

3. In a testing device for multiple electrode tubes, a first station, a balanced bridge circuit, switching means for connecting the tube electrodes into one arm of the bridge, relay means connected across the bridge, selective means operated by the relay means for identifying the tube, a second station, measuring means, second switching means to connect the measuring means to the electrodes, and second selective means operated by the high and low values of current flow to identify the tubes at this second station whereby defective tubes may be eliminated.

4. In a testing device for multiple electrode tubes, a continuously movable carrier, sockets for supporting the tubes carried thereby, said sockets being of different types for different tubes, switching means for supplying power to the sockets one type at a time, means for mechanically vibrating the tube to test for weak portions, a bridge circuit, switching means for connecting said tube elements in one arm of the bridge at one point of travel, relay means connected across the bridge and tube selective means controlled by the relay, a second selective means operated by extreme values of current, switching means to connect this last means to the tube at a further point of travel whereby each tube passes through a series of selective tests.

5. In a testing device for multiple electrode tubes, a plurality of tube supporting means capable of accommodating a plurality of different types of tubes, leads on the supporting means to each tube electrode, a power supply, measuring means and switching means capable of connecting any one of said leads to either the power supply or the measuring means whereby the proper electrodes of any type tube may have power supplied thereto and measurements made between them.

6. In a testing device for multiple electrode tubes, a continuously movable carrier, sockets for supporting the tubes carried thereby, said sockets being capable of accommodating a plurality of different types of tubes, a plurality of conductors connected to each socket and carried by said carrier, a plurality of groups of stationary sections of conducting material cooperating with the conductors over different portions of travel, a source of power, switching means for connecting said source of power to any one of said stationary sections whereby the proper electrodes of any tube may receive power during travel over any portion of the test.

7. In a testing device for multiple electrode tubes, a continuously movable carrier, sockets for supporting the tubes carried thereby, said sockets being capable of accommodating a plurality of different types of tubes, a plurality of conductors connected to each socket and carried by said carrier, a plurality of groups of stationary sections of conducting material cooperating with the conductors over different portions of travel, a source of power, measuring means, multiple point switches connected to the stationary sections and to both the source of power and the measuring means whereby either of the latter two may be connected to any of the stationary sections and thus place in proper circuit the elements of any type of tube.

8. In a testing device for multiple electrode tubes, a continuously movable carrier, sockets for supporting the tubes carried thereby, said sockets being capable of accommodating a plurality of different types of tubes, a plurality of conductors connected to each socket and carried by said carrier, a plurality of groups of stationary sections of conducting material cooperating with the conductors over different portions of travel, a source of power, a plurality of measuring means and a plurality of multi-layer, multi-point switching means to connect the source of power and the various measuring means to the groups of conducting sections whereby by a single control setting a group of tubes of a single type may be tested.

9. In a testing device for multiple electrode tubes, a plurality of sockets capable of accommodating various types of tubes, means for moving said sockets past test positions, stationary electrodes at each test position, means connected to each socket adapted to engage the various sections of stationary electrodes, a source of power, a plurality of measuring means and a plurality of multi-pole, multi-position switches connecting the source of power and the measuring means to the various sections of stationary electrodes, whereby various tube types may be tested by setting the switches to given positions.

10. In a testing device for multiple electrode tubes, a plurality of sockets capable of accommodating various types of tubes, means for moving said sockets past test positions, stationary electrodes at each test position, means connected to each socket adapted to engage the various sections of stationary electrodes, a source of power, a plurality of measuring means and a plurality of multi-pole, multi-position switches connecting the source of power and the measuring means to the various sections of stationary electrodes, whereby various tube types may be tested by setting the switches to given positions, and sorting means operated by said measuring means to segregate the tubes.

11. In a testing device for multiple electrode tubes, a plurality of sockets capable of accommodating various types of tubes, means for moving said sockets past test positions, stationary electrodes at each test position, means connected to each socket adapted to engage the various sections of stationary electrodes, a source of power, a plurality of measuring means and a plurality of multi-pole, multi-position switches connecting the source of power and the measuring means to the various sections of stationary electrodes, whereby various tube types may be tested by setting the switches to given positions, said measuring means including a bridge circuit and one pole of each switch varying the resistance in one arm of said bridge.

12. In apparatus for testing selective functions of multi-electrode tubes successively and during progressive travel of any one of a number of different types of a group of tubes, including a carrier having a path of travel past a plurality of test stations, a plurality of tube supporting means mounted on the carrier having contacts, current conducting means connected to the contacts carried by the carrier and projecting therefrom, a plurality of sectional conductive tracks mounted in the path of the carrier and adapted to be engaged by the current conducting means, a source of power, means to measure desired qualities of tubes and switching means to connect the measuring means and the power supply to a sectional group of contacts in any predetermined order whereby the power and measuring means may be connected to correct tube electrodes irrespective of what position they occupy in the tube.

13. In apparatus for testing selective functions of multi-electrode tubes successively and during progressive travel of any one of a number of different types of a group of tubes, including a carrier having a path of travel past a plurality of test stations and embodying a group of tube prong engaging contacts arranged to receive in predetermined relation the prongs of any tube of a group, current conducting means connected to the various prongs and carried by the carrier and projecting at an angle therefrom, a plurality of sectional conductive tracks mounted in juxtaposition to the carrier and adapted to be engaged by the current conducting means thereon, means to measure desired qualities of a tube, a power supply, switching means to connect the measuring means and the power supply to a sectional group of contacts in any predetermined order whereby the power and measuring means may be connected to the correct tube electrodes irrespective of in what position they appear in the tube.

14. In apparatus for testing selective functions of multi-electrode tubes successively and during progressive travel of any one of a number of different types of a group of tubes, including a carrier having a path of travel past a plurality of test stations and embodying a group of tube prong engaging contacts arranged to receive in predetermined relation the prongs of any tube of a group, current conducting means connected to the various prongs and carried by the carrier and projecting at an angle therefrom, a plurality of sectional conductive tracks mounted in juxtaposition to the carrier and adapted to be engaged by the current conducting means thereon, means to measure desired qualities of a tube, a power supply, switching means to connect the measuring means and the power supply to a sectional group of contacts in any predetermined order whereby the power and measuring means may be connected to the correct tube electrodes irrespective of in what position they appear in the tube and ejector means to force a tube from its supporting socket controlled by the measuring means.

GRAY K. GOULD.